United States Patent

Stenger

[11] Patent Number: 5,126,177
[45] Date of Patent: Jun. 30, 1992

[54] THERMOPLASTIC PREFORM FOR BLOW MOLDING A BOTTLE WITH REINFORCING RIBS

[75] Inventor: Donald R. Stenger, Rockford, Ill.
[73] Assignee: Johnson Enterprises, Inc., Rockford, Ill.
[21] Appl. No.: 783,139
[22] Filed: Oct. 28, 1991
[51] Int. Cl.⁵ .............................. B29B 11/14
[52] U.S. Cl. .................... 428/36.92; 428/542.8; 428/35.7; 215/1 C; 220/669; 220/671; 220/673; 220/675
[58] Field of Search ............ 428/36.92, 35.7, 542.8; 215/1 C; 220/669, 670, 671, 673, 675

[56] References Cited
U.S. PATENT DOCUMENTS 3,784,040  1/1974  Douglas .................. 215/1 C
4,307,137 12/1981  Ota ........................ 428/36.92
4,890,757  1/1990  Robbins ................. 215/1 C
4,977,005 12/1990  Krishnakumar ........ 428/542.8
4,997,692  3/1991  Yoshino .................. 428/36.92

Primary Examiner—Ellis P. Robinson
Assistant Examiner—Rena L. Dye
Attorney, Agent, or Firm—Leydig, Voit & Mayer, Ltd.

[57] ABSTRACT

A preform injection molded from PET includes a frustoconical section whose outer surface is formed with a series of angularly spaced ribs. When the preform is converted into a bottle by a blow molding operation, the frustoconical section of the preform is converted to a frustoconical top breast for the bottle while the external ribs of the preform are converted into internal ribs which are spaced angularly around the inner side of the top breast to increase the column strength thereof.

8 Claims, 3 Drawing Sheets

THERMOPLASTIC PREFORM FOR BLOW MOLDING A BOTTLE WITH REINFORCING RIBS

BACKGROUND OF THE INVENTION

This invention relates generally to an injection molded preform made of thermoplastic material and adapted to be formed into a container during a blow molding operation.

More specifically, the invention relates to a preform for use in blow molding a relatively large and generally cylindrical bottle (e.g., a five gallon bottle) for holding purified drinking water or the like. Bottles of this type usually include a generally cylindrical body, a generally frustoconical top breast at the upper end of the body, and a tubular filling and dispensing neck projecting upwardly from the central portion of the breast. In order to enable the bottle to be used with standard filling equipment, the inner diameter of the neck is approximately 1-⅜" and is small in comparison to the inner diameter (e.g., about 10") of the generally cylindrical body of the bottle.

While the preform may be made of various thermoplastic materials, the preferred material is polyethylene terephthalate (PET). Such material is recognized as being superior in many respects to materials such as polycarbonate and polyvinylchloride for use in water bottles and the like.

Blow molding of injection molded PET preforms is a widely used process for producing relatively small (e.g., two liter) bottles. Also, the assignee of the present invention has used such a process to make relatively large (e.g., 20 liter) spherical PET containers for use with draft beer or the like, such containers being known by the trade designator BEER SPHERE.

Large (e.g., five gallon) and generally cylindrical water bottles for use with standard filling equipment and standard dispensers have not been previously produced on a commercial basis by blow molding an injection molded PET preform. The difficulty in producing such a bottle resides in part in keeping the diameter of the filling and dispensing neck small in relation to the diameter of the generally cylindrical body while still imparting adequate strength to the container. A particularly vulnerable area of the container is its frustoconical top breast since the breast must support considerable weight when filled bottles are stacked on top of one another during shipment.

SUMMARY OF THE INVENTION

The general aim of the present invention is to provide a new and improved preform which enables the blow molding of a water bottle having a top breast which possesses superior column strength.

A more detailed object of the invention is to achieve the foregoing through the provision of a preform whose exterior surface is formed with unique angularly spaced ribs which, during the blow molding operation, are converted into internal ribs on the top breast of the bottle for purposes of increasing the column strength of the breast.

The invention also resides in the novel shape and positioning of the preform ribs in order to enable such ribs to be converted into structurally sound internal ribs in the top breast of the bottle.

These and other objects and advantages of the invention will become more apparent from the following detailed description when taken in conjunction with the accompanying drawings.

DETAILED DESCRIPTION OF THE PREFERRED EMBODIMENT

Figure 1:
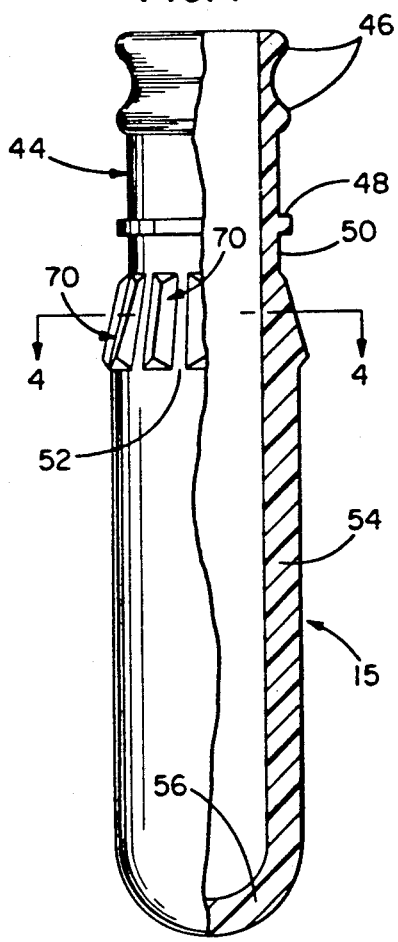
FIG. 1 is a side elevational view of a new and improved preform incorporating the unique features of the present invention, portions of the preform being broken away and shown in section.
Figure 2:
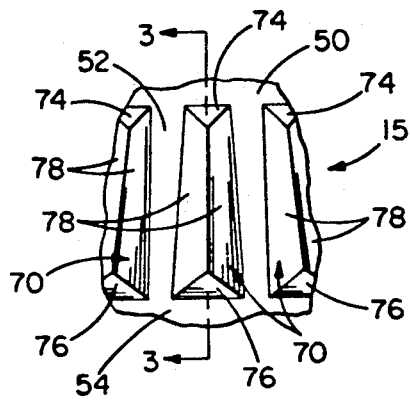
FIG. 2 is an enlarged face view of one of the ribs of the preform.
Figure 3:
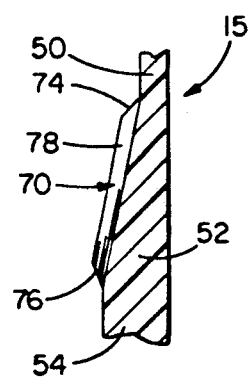
FIG. 3 is a fragmentary cross-section taken substantially along the line 3—3 of FIG. 2.
Figure 4:
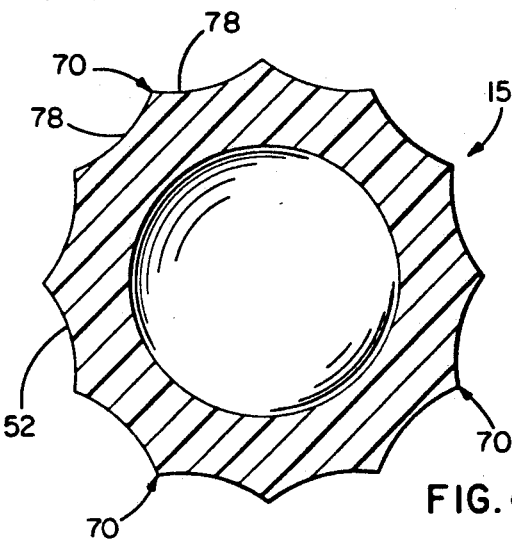
FIG. 4 is an enlarged fragmentary cross-section taken substantially along the line 4-4 of FIG. 1.

For purposes of illustration, the invention has been shown in the drawings as incorporated in an injection molded preform 15 for use in blow molding a water bottle 20 of the type used to hold purified water and typically installed in an inverted position on a gravity-type dispenser (not shown). The present bottle has a capacity of five gallons although it should be appreciated that the principles of the invention are applicable to preforms for making other sizes of bottles. Also, the present bottle preferably is blow molded from a PET preform but other thermoplastic materials could be used for the preform.

Figure 5:
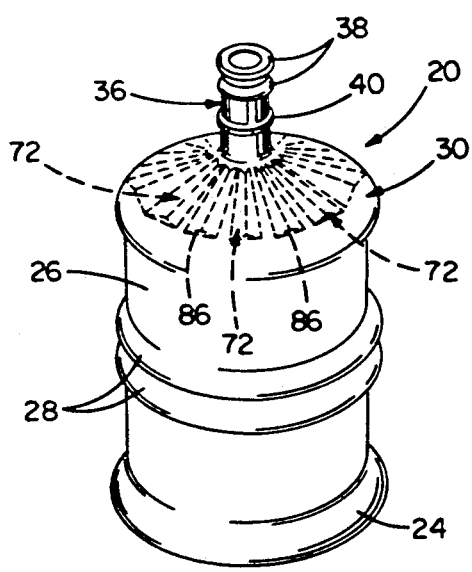
FIG. 5 is a perspective view of a bottle adapted to be blow molded from the preform of the invention.
Figure 13:
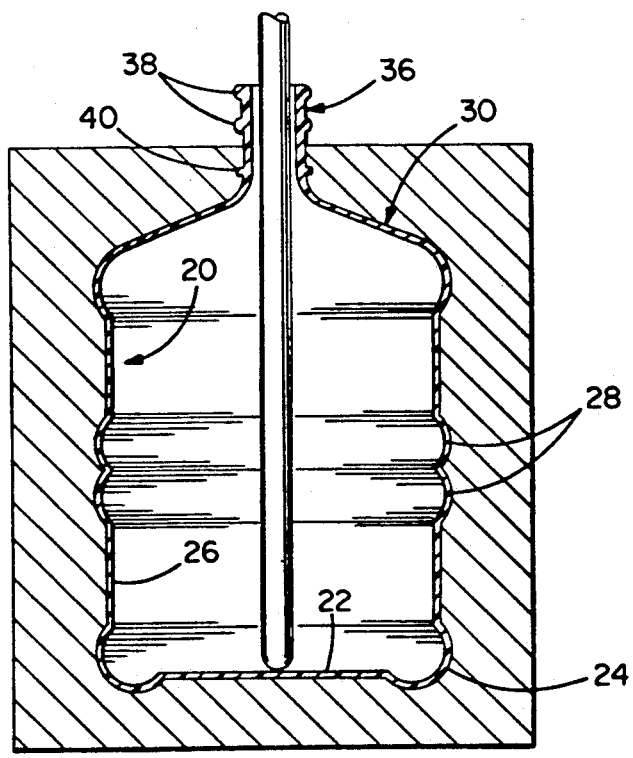
FIG. 13 is a view similar to FIG. 12 but shows the bottle fully blown in the mold.

As shown most clearly in FIGS. 5 and 13, the bottle 20 is of one-piece construction and is formed with a generally circular bottom wall 22 having an enlarged, bulbous and ring-like peripheral portion 24 which strengthens the bottom while defining an annular foot for the bottom. Extending upwardly from the peripheral portion is a generally cylindrical side wall 26. Two ring-like bulbuous portions 28 are located midway along the height of the side wall to increase the hoop and column strength of the side wall.

Figure 11:
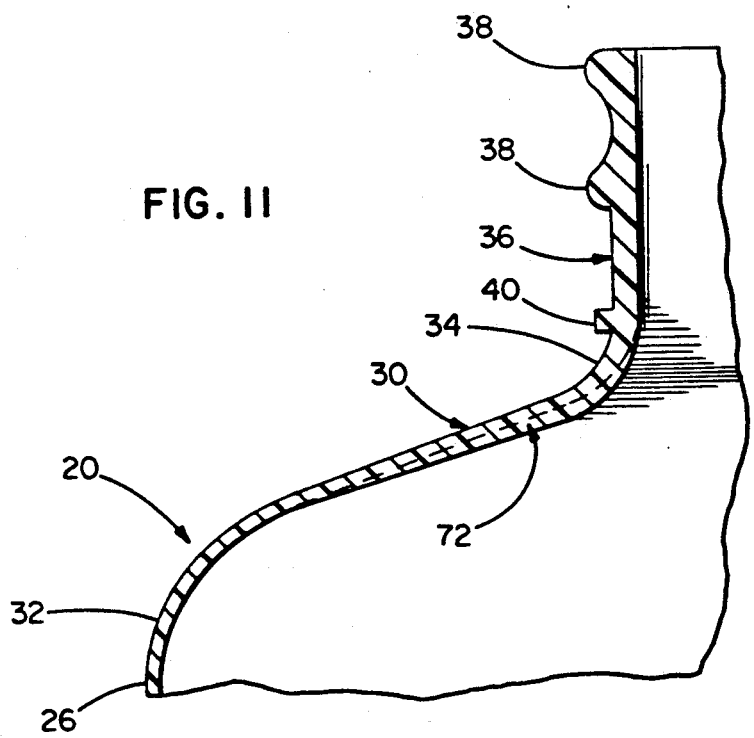

Located at the upper end of the side wall 26 and extending upwardly and inwardly therefrom is a top breast 30 which is generally frustoconical except for a convexly curved lower portion 32 (FIG. 11) immediately adjacent the upper end of the side wall 26 and except for a concavely curved upper portion 34 at the upper end of the breast. The concavely curved portion merges gradually with a tubular neck 36 which extends upwardly from the center portion of the breast. In the present bottle 20, the neck is formed with two upper rings 38 (FIG. 11) which coact with a removable closure (not shown) and with a lower ring 40 which may be engaged by a hand tool for lifting and carrying the bottle. As is typical of bottles of this kind, the diameter of the neck is small in comparison to the diameter of the sidewall 26. For example, the inner diameter of the neck may be only about 1-⅜" while the inner diameter of the side wall may be in the neighborhood of 10".

The preform 15 from which the bottle 20 is molded is shown most clearly in FIGS. 1 to 4 and comprises a neck 44 with rings 46 and 48. The neck 44 and the rings 46 and 48 of the preform 15 are not changed during the blow molding operation and they form the neck 36 and the rings 38 and 40, respectively, of the ultimate bottle 20.

A short cylindrical preform section 50 (FIG. 1) is located immediately below the ring 48 and immediately above a frustoconical section 52 which forms the breast 30 of the ultimate bottle 20. The frustoconical section 52 tapers inwardly as it progresses upwardly.

The preform 15 further includes a cylindrical body section 54 (FIG. 1) located below the frustoconical section 52 and used to form the side wall 26 and the ring-like bulbous portions 28 of the bottle 20. At its lower end, the cylindrical body section 54 merges gradually with a generally hemispherical end section 56 which eventually forms the bottom wall 22 and the annular foot 24 of the bottle. The side section 54 and the end section 56 of the preform have a relatively large wall thickness of approximately ¼".

Figure 12:
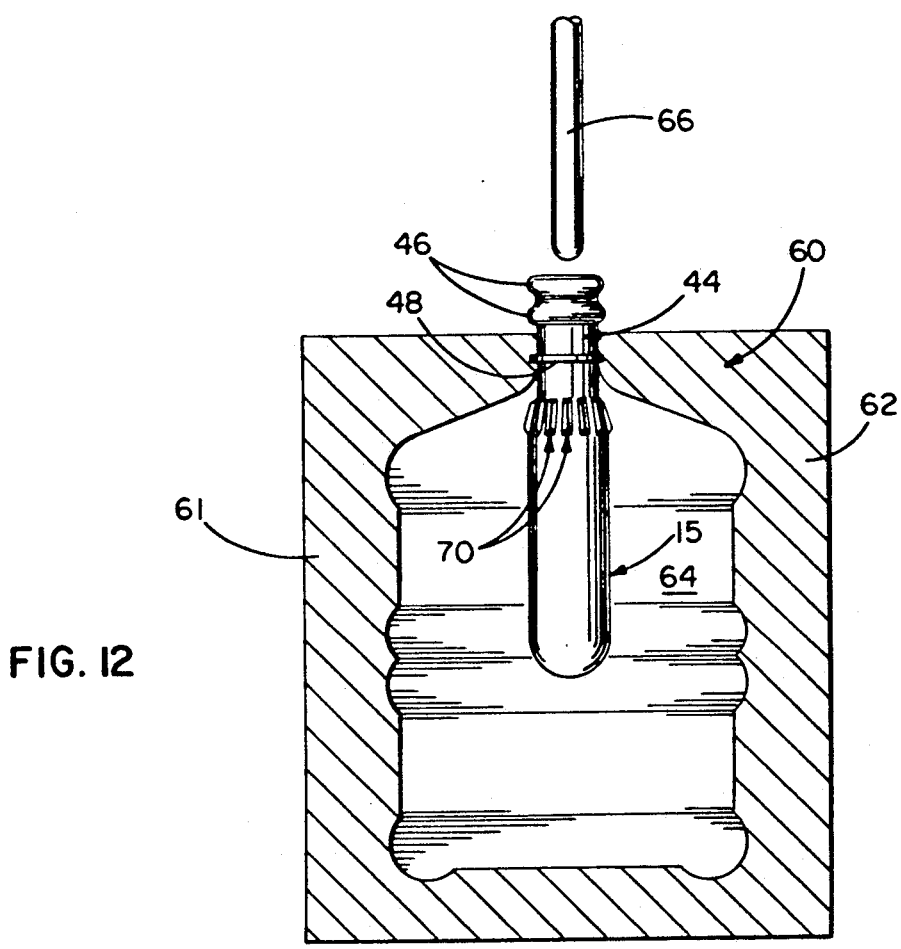
FIG. 12 is a cross-sectional view schematically showing the preform in a blow mold prior to blowing of the bottle.

To form the bottle 20, the preform 15 is heated and is positioned in a blow mold 60 as shown in FIG. 12 with the neck 44 held by the two mold halves 61 and 62 and with the remainder of the preform extending downwardly into a cavity 64 having a shape corresponding to the external shape of the bottle. While the preform is in a soft state, pressurized air is injected into the neck 44 at a controlled rate to cause the material of the preform to stretch and expand into engagement with the wall of the cavity and thereby convert the preform into the bottle. As air is injected into the neck 44, a stretch rod 66 is moved downwardly into the preform and engages the bottom section 56 thereof to help center and shape the bottle and to help keep the bottle of substantially uniform wall thickness.

Blow molding of bottles from injection molded PET preforms is conventional in and of itself. In the present bottle 20, however, the ratio of the diameter of the side wall 26 to the diameter of the neck 36 is relatively high, herein on the order of six to one. As a result of this high aspect ratio, the frustoconical breast 30 is relatively large in area and inherently possesses low column strength.

In accordance with the present invention, the column strength of the frustoconical breast 30 of the bottle 20 is increased significantly by providing a series of angularly spaced ribs 70 around the outer side of the frustoconical section 52 of the preform 15. When the preform is subjected to the blow molding operation, the external ribs 70 on the preform are converted into internal ribs 72 (FIG. 5, FIGS. 7 to 9 and FIG. 11) on the inner side of the breast 30, the latter ribs serving to improve the column strength of the breast.

More specifically, twelve equally spaced ribs 70 are formed on the outer surface of the frustoconical section 52 of the present preform 15. Each rib 70 extends substantially axially along the frustoconical section 52 and includes an upper end 74 (FIGS. 2 and 3) located closely adjacent the junction of the frustoconical section 52 with the cylindrical section 50 of the neck 44. Each rib 70 also includes a lower end 76 located closely adjacent the junction of the frustoconical section 52 with the cylindrical body section 54. As each rib 70 proceeds from its upper end 74 toward its lower end 76, it progressively increases in circumferential width and also progressively increases in radial thickness (see FIGS. 2 and 3). The two ends 74 and 76 of each rib 70 are disposed in oppositely sloped planes which are inclined at obtuse angles relative to the neck section 50 and the body section 54, respectively. The two ends 74 and 76 are shaped as similar isosceles triangles but the upper triangular end 74 is smaller in size than the lower triangular end 76.

Each rib 70 of the preform 15 is completed by two sides 78 which face in circumferentially opposite directions. Each side 78 is shaped substantially as a trapezium and extends between the upper and lower ends 74 and 76 of the rib 70. The two sides 78 of each rib 70 join one another along a line which extends generally axially between the outermost apices of the upper and lower ends 74 and 76.

When the softened preform 15 is blown and stretched by the pressurized air injected into the neck 44, the external ribs 70 elongate in length and reduce in thickness as the frustoconical section 53 of the preform starts stretching into the form of the frustoconical breast 30 of the ultimate bottle 20. In addition, the lower end portions of the ribs 70 start diverging or fanning away from the upper end portions of the ribs as the frustoconical section 52 is stretched and is converted into the frustoconical breast 30.

Upon engaging the smooth frustoconical sides of the mold cavity 64, the external ribs 70 of the preform 15 are forced inwardly and form the internal ribs 72 of the ultimate bottle 20. In other words, with the continued application of internal pressure in the preform and upon engagement of the external ribs 70 with the sides of the cavity 64, the ribs have no place to go but inwardly and thus the thick material which originally formed ribs 70 on the outside of the preform is displaced inwardly and is converted into ribs 72 on the inside surface of the frustoconical breast 30 of the bottle 20.

Figure 7:
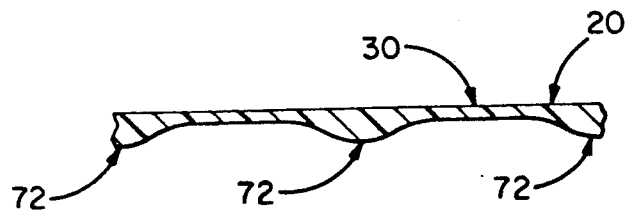
FIGS. 7, 8, 9, 10 and 11 are enlarged fragmentary cross-sections taken substantially along the lines 7—7, 8—8, 9-9, 10—10 and 11—11, respectively, of FIG. 6.
Figure 8:
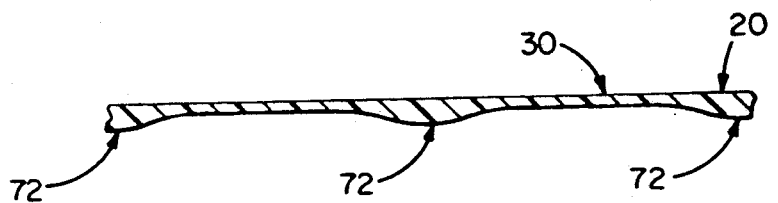
Figure 9:
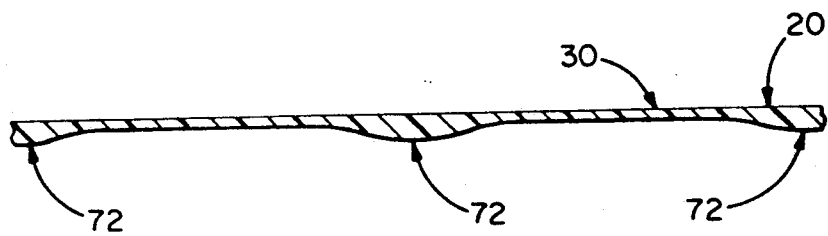
Figure 10:
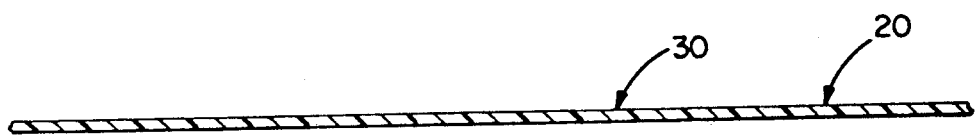

The cross-sectional configuration of the bottle ribs 72 is best shown in FIGS. 7 to 10. As illustrated, each rib 72 is relatively thick and has a comparatively small angular width along that length of the rib adjacent the upper end portion of the breast 30. As each rib proceeds downwardly and outwardly along the interior of the breast, its thickness progressively decreases while its width progressively increases as illustrated in FIGS. 8 and 9, the decrease in thickness also being shown by FIG. 11. Finally, each rib 72 completely disappears near the extreme lower end portion of the breast 30 as depicted in FIG. 10.

FIGS. 7 to 9 also illustrate how the bottle ribs 72 fan away from one another as the ribs progress downwardly from the upper end portion of the frustoconical breast 30 toward the lower end thereof. As shown in FIG. 7, the angular spacing between the ribs 72 is relatively small near the upper end portion of the breast but, as the ribs proceed downwardly, the angular spacing progressively increases as illustrated in FIGS. 8 and 9.

Figure 6:
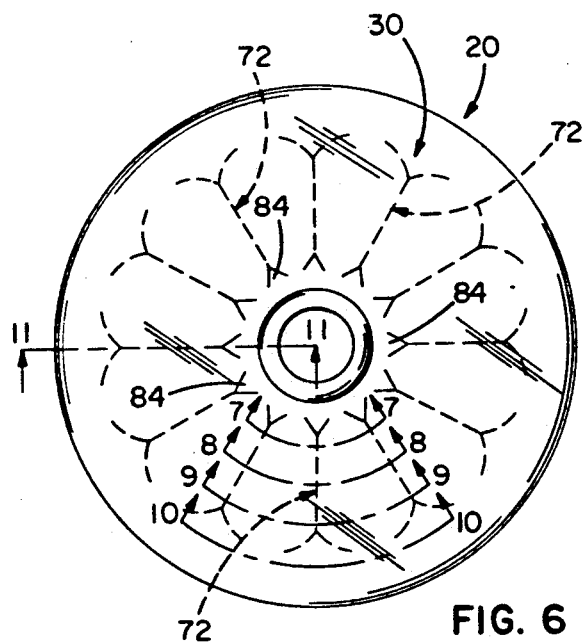
FIG. 6 is an enlarged top plan view of the bottle.

In some cases, the extreme upper ends 74 of the preform ribs 70 may retain their original form after the preform 42 has been converted into the bottle 20. This results in generally triangular protrusions 84 (FIG. 6) being left on the outside of the breast 30 in the area of the concavely curved portion 34. Also, the extreme lower ends 76 of the preform ribs become greatly stretched during the blow molding operation and cause angularly spaced triangular impressions 86 (FIG. 5) to be left on the inner side of the breast adjacent the convexly curved portion 32.

With the foregoing arrangement, the fan-shaped array of ribs 72 on the inside of the frustoconical breast 30 significantly increases the column strength of the breast and reduces flexing and collapsing of the breast when bottles are stacked on top of one another. The ribs are virtually undetectable to feel on the outside of the breast and create a distinctive sunburst appearance through the transparent top of the breast. The internal ribs 72 on the breast 30 result from the external ribs 70 on the preform 15 and are formed without need of any special tooling in the blow mold 60.

I claim:

1. A preform for use in blow molding a container; said preform being made of a single piece of thermoplastic material and having a generally cylindrical neck section, having a generally cylindrical body section spaced axially from said neck section and having a generally frustoconical section located between said neck section and said body section; said frustoconical section having an outer surface which increases in diameter upon progressing away from said neck section and toward said body section; and a plurality of ribs spaced angularly around and projecting outwardly from the outer surface of said frustoconical section.

2. A preform as defined in claim 1 in which said ribs are spaced equally from one another around said frustoconical section.

3. A preform as defined in claim 2 in which each rib includes a first end located closely adjacent the junction of said frustoconical section with said neck section and includes a second end located closely adjacent the junction of said frustoconical section with said body section.

4. A preform as defined in claim 3 in which each rib extends substantially axially along said frustoconical section.

5. A preform as defined in claim 1 in which each rib includes a first generally triangular end portion located closely adjacent the junction of said frustoconical section with said neck section, said first end portion being disposed in a first plane inclined at an obtuse angle relative to said neck section, each rib including a generally triangular second end portion located closely adjacent the junction of said frustoconical section with said body section, said second end portion being disposed in a second plane inclined at an obtuse angle relative to said body section and inclined oppositely of said first plane, said first triangular end portion being substantially the same shape as and being smaller in size than said second triangular end portion, each of said ribs having two sides facing in circumferentially opposite directions, each of said sides being shaped substantially as a trapezium and extending between said first and second triangular end portions.

6. A preform as defined in claim 5 in which the triangular end portions of each rib each includes an outermost apex, the two sides of each rib joining one another along a line extending axially between the outermost apices of the triangular end portions of the ribs.

7. A preform as defined in claim 5 in which each rib progressively increases in circumferential width and progressively increases in radial thickness as such rib proceeds from its first end portion toward its second end portion.

8. A preform for use in blow molding a container; said preform being made of a single piece of thermoplastic material and having a generally cylindrical neck section, having a generally cylindrical body section spaced axially from said neck section and having a generally frustoconical section located between said neck section and said body section; said frustoconical section having an outer surface which increases in diameter upon progressing away from said neck section and toward said body section; a plurality of ribs spaced equally around and projecting outwardly from the outer surface of said frustoconical section, each rib extending substantially axially along said frustoconical section and including a first end located closely adjacent the junction of said frustoconical section with said neck section, each rib including a second end located closely adjacent the junction of said frustoconical section with said body section, each rib progressively increasing in circumferential width and progressively increasing in radial thickness as such rib proceeds from its first end toward its second end.

* * * * *